May 6, 1930. J. L. BROWN 1,757,615

PLUNGER OVERFLOW FOR SEALED SLEEVE BEARINGS

Filed Aug. 25, 1927

INVENTOR
John L. Brown.
BY
Wesley Sloan
ATTORNEY

Patented May 6, 1930

1,757,615

UNITED STATES PATENT OFFICE

JOHN L. BROWN, OF VERONA, PENNSYLVANIA, ASSIGNOR TO WESTINGHOUSE ELECTRIC & MANUFACTURING COMPANY, A CORPORATION OF PENNSYLVANIA

PLUNGER OVERFLOW FOR SEALED SLEEVE BEARINGS

Application filed August 25, 1927. Serial No. 215,344.

My invention relates to bearing filling and overflow devices, and it has particular relation to a combined filling and overflow plunger mechanism for use in substantially hermetically sealed bearing housings.

The principal object of my invention is to provide means, in a device of the character just specified, whereby the sealing of the bearing housing is broken during the filling operation.

Figure 1:
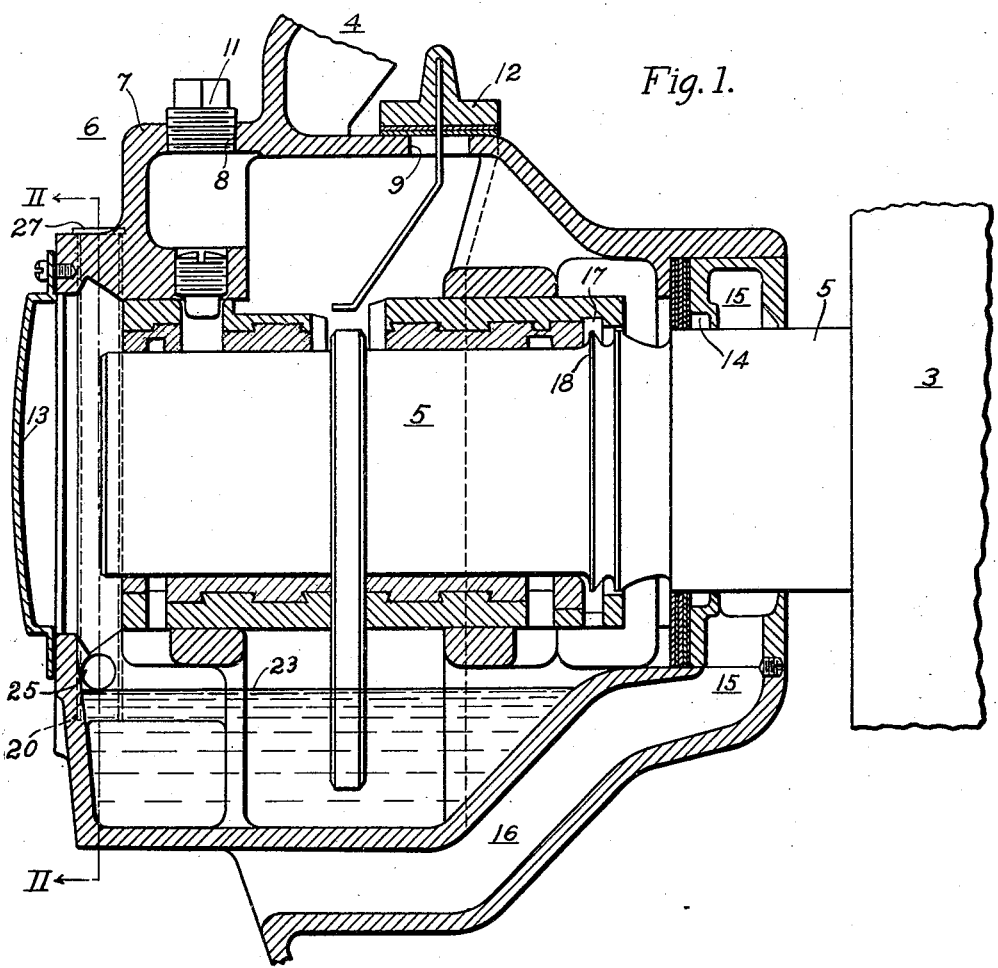
Figure 2:
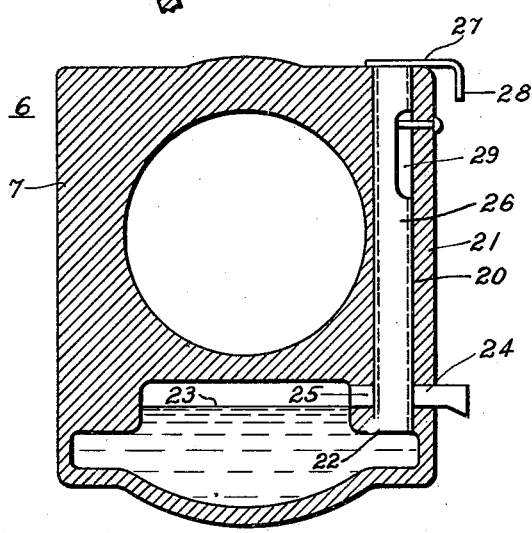

My invention will best be understood from the following description, when considered in connection with the accompanying drawing, wherein Figure 1 is a longitudinal, vertical sectional view of a sealed bearing housing equipped with a sleeve bearing and embodying my invention, and Figure 2 is a transverse sectional view through the plunger overflow device, taken on section line II—II in Fig. 1.

Heretofore, in sleeve bearing housings of ordinary construction, it has been customary to provide an opening for the overflow plug below the level of the oil in the reservoir, and to attach a sealing and overflow plug to said opening, thus providing a small part which projects out from the housing and which is liable to be broken off through accident or rough handling, thereby permitting oil to run out of the reservoir. Furthermore, the hole in the housing below the oil level may develop a leaky joint which would tend to make the bearing run dry. Moreover, the point of application of the oil-can spout to such an overflow opening, when it has been utilized as a filling opening, is quite low down, where it may be relatively inaccessible and hard to find, and where it often causes interference with the accessories, such as brakes, pulleys, external collector housings, etc.

I overcome the difficulties just mentioned by utilizing a modified form of the plunger overflow device which is shown generically in a patent of Ehrenfeld and Kucher, No. 1,506,741, issued September 2, 1924, and assigned to the Westinghouse Electric & Manufacturing Company.

My invention is most effective when utilized in a sealed sleeve bearing housing of the type described and claimed in a patent of Raoul Pruger, No. 1,621,751, and in my Patent No. 1,621,709, both issued March 22, 1927 and assigned to the Westinghouse Electric & Manufacturing Company.

The sealed sleeve bearing just mentioned utilized an improved overflow and filling plug which is described in the patent to Raoul Pruger and myself No. 1,494,322, granted May 13, 1924 and assigned to the Westinghouse Electric & Manufacturing Company. It is the object of my invention to provide a still further improvement in overflow and filling devices, particularly with reference to bearing housings of the hermetically sealed type.

The general features of the sealed sleeve bearing housing are indicated in Fig. 1, which shows a motor rotor member 3 and stator member 4, the rotor member being carried by a shaft 5 which is journalled in a sleeve bearing 6. The bearing comprises a substantially hermetically tight housing 7, the top openings 8 and 9 of which are tightly closed by means of closure members 11 and 12, respectively.

In the bearing which is shown in the drawing, the shaft does not extend through the stator frame 4, the end of which is hermetically closed by means of a bearing cap member 13.

The inner end of the shaft 5, which extends through the inner end of the bearing, is protected by means of an improved bearing cap member 14, as covered by my above-mentioned patent, whereby oil is prevented from leaking into the machine, dirt is prevented from entering the bearing, and the ingress or egress of air into or out of the bearing is, to a very large extent, prevented.

An annular chamber 15 is sometimes also provided around the shaft at the inner end of the bearing, and connected to the atmosphere through a passageway 16, as covered by a patent of Hellmund and Moore, No. 1,329,241, granted January 27, 1920, and assigned to the Westinghouse Electric & Manufacturing Company, in order to reduce the suction or compression which might otherwise develop at this point, as a result of the operation of the rotor member 3 or from an external source of air pressure as for ventilating purposes.

In a bearing such as that just described, a certain amount of end play of the shaft is usually permitted, as indicated by the thrust-bearing surfaces 17 and 18, with the result that, under exceptional circumstances, as when a crooked belt is utilized, the shaft may move longitudinally into and out of the bearing compressing the air as it moves in, and decreasing the air pressure when it moves out. In the instances in which the shaft passes all the way through the bearing, it sometimes happens that the shaft is larger at one end than at the other, so that the end play results in a shaft-section or piston of one diameter moving into the bearing while a shaft-section or piston of another diameter moves out, thereby causing the same pumping action, although on a slightly reduced scale.

The pumping just mentioned is particularly noticeable when an attempt is made to fill a hermetically sealed bearing of the type described, while the motor is in operation, as the pumping action is occasionally sufficiently severe to expel oil from the filling opening if the latter is opened while the motor is running.

As many motors produce a suction around the rotor member close to the shaft, at the inner end of the bearing, and as the inner end of a sleeve bearing housing, where the shaft extends through the same, is a point in the bearing housing which is the most difficult to seal, it has resulted that a partial vacuum has sometimes been produced within the bearing housings of motors equipped with sealed sleeve bearings.

Although the reduction in air pressure within the bearing, in any case, is very slight, it does not take much difference in air pressure to sustain a column of a fraction of an inch of oil, so that, in exceptional circumstances, when the filling and overflow plug, which has been heretofore almost universally used on sleeve bearing housings, has been opened on a sealed bearing housing, during the operation of the motor, for the purpose of filling the bearing, the oil has sometimes been sucked down to a false level in the filling opening, thereby inducing the operator to insert sufficient excess oil into the housing to raise the indicated oil level to the top of the overflow device, so that the excess oil will be spilled from the overflow plug when the motor next comes to rest, thereby indicating a false appearance of leakage.

In my present invention, the operation is materially improved by the adoption of a modified plunger overflow mechanism of the type shown in the aforesaid Ehrenfeld and Kucher patent.

Referring to Figs. 1 and 2 of the drawing, it will be noted that a substantially vertical passageway 20 is provided in a wall member 21 of the bearing housing, said passageway extending from a top portion of the housing to a point 22, below the normal oil level 23 in the reservoir. Openings 24 and 25 are provided in the walls of the passageway 20, communicating with the outside of the bearing and the inside of the reservoir at the top of the normal oil level 23 therein.

A tubular overflow plug or pipe 26 is slideably mounted in the vertical passageway 20 and is provided with a permanent top closure 27 which terminates in a handle member 28 which can be readily engaged by the spout of an oil can to lift the plunger to fill the bearing. Near the top of the plunger or tube 26 there is an elongated lateral slot or opening 29, which is disposed within the passageway in the normal lowered position of the overflow plunger but which is exposed at the top of the passageway in the elevated or filling position of the plunger.

It will be noted, from Fig. 2, that the bottom of the plunger normally seals the bottom of the vertical passageway 20, which is really a pipe extending into the bearing reservoir below the oil level thereof, and that the plunger 26, when it is elevated, will unseal the openings 24 and 25 whereby it becomes possible for the oil to overflow from the overflow opening 24 when too much oil has been placed in the bearing during the filling thereof. At the same time, the other opening 25 is put in communication with the atmosphere, whereby the substantially hermetical sealing of the bearing is broken during the filling operation, so that there will be no pumping or suction action.

When the plunger is dropped after the filling operation, the openings 24 and 25 are again sealed, no particular precautions being necessary because there is no opportunity for oil to be drawn by capillary action, and also, by reason of the presence of the oil, the ingress and egress of air are effectually prevented, so that small differences of pressure may exist between the inside and the outside of the bearing.

From the foregoing description, it will be evident that I have provided means for improving bearing-filling devices, and particularly the prior plunger overflow device, of the prior art, and have provided a neat and compact construction wherein the bearing may be filled from the top of the bearing housing, which is the natural and easiest place to oil, the overflow opening being automatically opened and closed at the proper times.

The sealed sleeve bearing housing, as heretofore constructed, is so well sealed that it is quite leak-proof, and bearings have run for several years without the necessity for refilling. Consequently, when my improved plunger overflow is utilized it is only necessary, at infrequent intervals of six to twelve months, to insert the end of an oil-can spout under the handle member 28 and insert a little oil until it overflows from the overflow opening 24, after which the overflow plug 26 drops into place and again seals the bearing for another uninterrupted run of indefinite duration.

While I have described my invention in a preferred form and in its prefered application to a sealed bearing housing, I do not wish to be altogether limited thereto and I desire that the appended claims shall be given the broadest interpretation consistent with their wording and the prior art.

I claim as my invention:

1. A bearing having an oil reservoir in the bottom thereof and having a wall member provided with a substantially vertical passageway extending from a top portion of the bearing housing to a point below the normal oil level within said reservoir, openings in the walls of said passageway communicating with the outside of the bearing and the inside of said reservoir, both of said openings being at the top of the normal oil level therein, and a vertically movable valve mechanism for substantially sealing both of said openings in one position and for uncovering both of said openings in another position.

2. A bearing having an oil reservoir in the bottom thereof and having a wall member provided with a substantially vertical passageway extending from a top portion of the bearing housing to a point below the normal oil level within said reservoir, openings in the walls of said passageway communicating with the outside of the bearing and the inside of said reservoir at the top of the normal oil level therein, and a vertically movable pipe disposed in said passageway and having a permanently closed top member and a lateral opening near the top, said lateral opening and the two oil-level openings being all exposed in the upper position of the pipe, and all three openings being closed in the lower position thereof.

3. A substantially hermetically sealed bearing having an oil reservoir in the bottom thereof and having a wall member provided with a substantially vertical passageway extending from a top portion of the bearing housing to a point below the normal oil level within said reservoir, openings in the walls of said passageway communicating with the outside of the bearing and the inside of said reservoir at the top of the normal oil level therein, and a combined filling and overflow plunger for closing both of said openings in the closed position and for breaking the seal above the oil level within said bearing in the filling position of said plunger.

4. A substantially hermetically sealed bearing having an oil reservoir in the bottom thereof and having a substantially vertical passageway in one wall thereof communicating with said reservoir, said housing being also provided with an overflow passage communicating with said passageway extending laterally through one of the side walls thereof and opening into the outside atmosphere, and a hollow member adapted to move longitudinally within said passageway and close said passageway and overflow passage when in one position and to open said overflow passage, break the seal above the oil level within said bearing and permit the introduction of oil into said passageway when in another position.

5. A substantially hermetically sealed bearing having an oil reservoir in the bottom thereof and having a substantially vertical passageway in one wall thereof communicating with said reservoir, an overflow opening communicating with said passageway at the normal oil level in said reservoir, a tube movably disposed within said passageway, said tube having its top end closed and being provided with an opening disposed intermediate its ends, said last-mentioned opening being closed when said tube is in its normal position and being in communication with both the interior and the exterior of the housing when said tube is actuated to a predetermined position, said overflow opening being sealed in the normal position of said tube and being in communication with the space above the oil within said reservoir when said tube is in the aforesaid predetermined position.

6. The combination with a dynamo-electric machine adapted during its operation, to create a pressure other than atmospheric pressure adjacent to the shaft of the machine, of a substantially hermetically sealed bearing for said shaft adapted to operate with a pressure other than atmospheric pressure therein, said bearing having an oil reservoir in the bottom thereof and having a wall member provided with a substantially vertical passageway extending from a top portion of the bearing housing to a point below the normal oil level within said reservoir, openings in the walls of said passageway communicating with the outside of the bearing and the inside of said reservoir at the top of the normal oil level therein, and a pipe disposed in said passageway and having a permanently closed top member and a lateral opening near the top, said lateral opening and the two oil-level openings being all exposed in the upper position of the pipe, and all three openings being closed in the lower position thereof.

7. The combination of a dynamo-electric machine and a substantially sealed bearing therefor so mounted as to provide for longitudinal end play of the machine shaft in said bearing, said end play causing air pressure variations within said bearing, said bearing having an oil reservoir in the bottom thereof and having a substantially vertical passageway in one wall thereof communicating with said reservoir, an overflow opening communicating with said passageway at the normal oil level in said reservoir, a tube movably disposed within said passageway, said tube having its top end closed and being provided with an opening disposed intermediate its ends, said last-mentioned opening being closed when said tube is in its normal position and being in communication with both the interior and the exterior of the housing when said tube is actuated to a predetermined position, said overflow opening being sealed in the normal position of said tube and being in communication with the space above the oil within said reservoir when said tube is in the aforesaid predetermined position.

In testimony whereof, I have hereunto subscribed my name this 17th day of August, 1927.

JOHN L. BROWN.